(12) United States Patent
Creazzo et al.

(10) Patent No.: US 7,754,096 B2
(45) Date of Patent: Jul. 13, 2010

(54) LIQUEFIED-GAS AEROSOL DUSTING COMPOSITION CONTAINING DENATONIUM BENZOATE

(75) Inventors: Joseph Anthony Creazzo, Wilmington, DE (US); Gary W. Jepson, Newark, DE (US); Gregory Mas, Branchburg, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/895,070

(22) Filed: Aug. 22, 2007

(65) Prior Publication Data

US 2008/0188393 A1      Aug. 7, 2008

Related U.S. Application Data

(60) Provisional application No. 60/898,865, filed on Feb. 1, 2007.

(51) Int. Cl.
*C09K 5/00*       (2006.01)
*B08B 3/14*       (2006.01)

(52) U.S. Cl. ............... 252/69; 252/67; 252/71; 252/365; 134/42

(58) Field of Classification Search ........... 134/42; 252/67, 71, 365
See application file for complete search history.

(56) References Cited

U.S. PATENT DOCUMENTS

| | | | | |
|---|---|---|---|---|
| 3,923,997 A * | 12/1975 | Meuly | ........................ | 514/460 |
| 4,192,862 A * | 3/1980 | Pengilly | ...................... | 424/47 |
| 5,217,640 A * | 6/1993 | Narayanan et al. | ........... | 510/201 |
| 5,262,077 A * | 11/1993 | Bivens et al. | ................. | 252/67 |
| 5,281,409 A * | 1/1994 | Thayer et al. | ................. | 424/47 |
| 5,891,919 A * | 4/1999 | Blum et al. | ................. | 514/625 |
| 5,968,535 A * | 10/1999 | Mansfeld et al. | ............ | 424/401 |
| 6,037,404 A | 3/2000 | Dahm et al. | | |
| 6,117,356 A * | 9/2000 | Powell et al. | ................. | 252/67 |
| 6,136,303 A * | 10/2000 | Ruebusch et al. | ............. | 424/65 |
| 6,281,213 B1 * | 8/2001 | Gawin et al. | ........... | 514/252.13 |
| 2002/0063234 A1 * | 5/2002 | Powell et al. | ................. | 252/67 |
| 2004/0197273 A1 * | 10/2004 | Schultz et al. | ................ | 424/45 |
| 2006/0243945 A1 * | 11/2006 | Minor et al. | ................. | 252/67 |
| 2007/0241306 A1 * | 10/2007 | Wehner et al. | ................ | 252/67 |
| 2008/0202627 A1 * | 8/2008 | Mas et al. | ..................... | 141/3 |

FOREIGN PATENT DOCUMENTS

| | | |
|---|---|---|
| EP | 0452762 | 7/1991 |
| EP | 0990689 | 5/2000 |
| JP | 04308504 | * 10/1992 |
| JP | 04308504 A | * 10/1992 |

(Continued)

OTHER PUBLICATIONS

Bitrex (TM) website; web archive http://www.bitrex.com/bitrex/pages/technichal_frameset.htm, Apr. 2003.*

(Continued)

*Primary Examiner*—James Seidleck
*Assistant Examiner*—Jane L Stanley

(57) ABSTRACT

A liquefied-gas aerosol dusting composition is disclosed for preventing inhalation abuse incidents. The composition comprises at least one liquefied gas and denatonium benzoate, wherein the concentration of said denatonium benzoate in said aerosol dusting composition ranges from about 5 ppm to about 50 ppm.

12 Claims, 2 Drawing Sheets

FOREIGN PATENT DOCUMENTS

| | | | |
|---|---|---|---|
| JP | 06293882 | * | 10/1994 |
| WO | WO 9600564 | * | 1/1996 |

OTHER PUBLICATIONS

Falcon Safety Products press release, Kyle Kappmeier, R&J Public Relations, LLC. "New Dust-Off (TM) Formula Deters Inhalant Abuse". Oct. 23, 2006.*

Falcon Dust-Off(TM) Duster MSDS, "Dymel" 152a, Oct. 30, 2006.*

Techspray Dusting Gas, ENVI-RO-TECH(TM) 1671 Duster MSDS, HFC-134a, Jan. 10, 2006.*

JP 04308504 A derwent abstract.*

JP 06293882 Derwent abstract, patent family of JP 2772608 B2.*

Machine translation of JP 2772608 B2.*

MSDS 1,1,1,2-tetrafluoroethane.*

* cited by examiner

Figure 1: Denatonium Benzoate in Duster Vapor

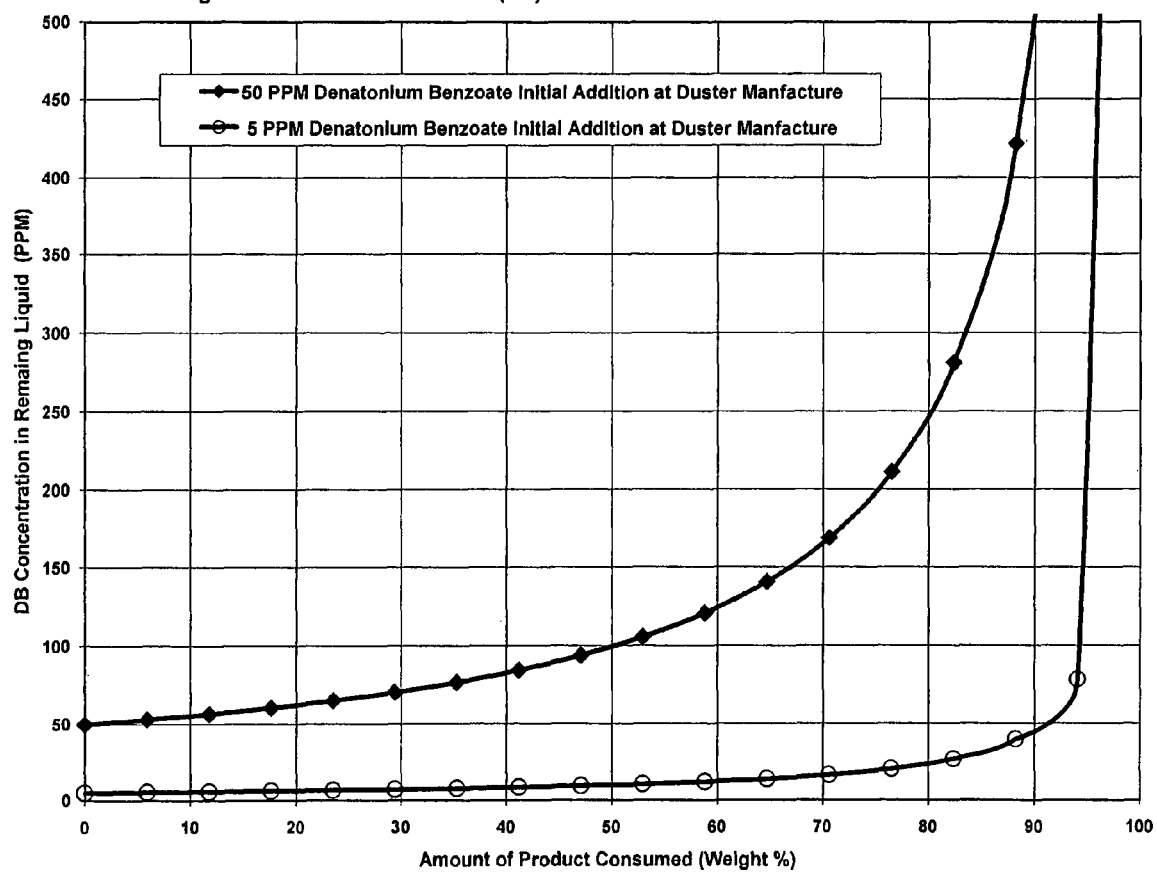

LIQUEFIED-GAS AEROSOL DUSTING COMPOSITION CONTAINING DENATONIUM BENZOATE

BACKGROUND OF THE INVENTION

1. Field of the Disclosure

The present disclosure relates in general to denatured liquefied-gas aerosol dusting compositions. In particular, the present disclosure relates to liquefied-gas aerosol dusting compositions containing denatonium benzoate.

2. Description of Related Art

Liquefied-gas aerosol dusters provide a safe, useful, convenient, and economically efficient means of cleaning dust and debris from hard to reach places, where it can be harmful or detrimental. This can be especially true for the multitude of electronic equipment used today, where small foreign particles can render expensive equipment inoperable or shorten its useful life. These aerosol dusters provide an easily available source of pressurized gas that can be used to remove such debris. Packaged in appropriately designed aerosol cans, the liquefied gas and aerosol package components can be chosen so as to deliver a pressurized burst of gas in a preferred cleaning pattern. The aerosol valve and actuator can be configured to deliver the appropriate amount of gas at the right pressure in a range from broad to pinpoint spray patterns. Using liquefied gases provides an ample supply of material for a large number of cleaning tasks in a compact package.

The manufacturer and supplier of these products expend significant resources and energy toward good product stewardship with goals of providing products that are safe when used as intended. Thus, these duster products provide a safe and valuable function to the consumer, but sometimes are involved in inhalation abuse incidents, like numerous other consumer products.

The primary weapon in battling these dangerous practices continues to be education to raise awareness of the potential consequences. There are, however, other opportunities to discourage such practices with product design or product control. One such approach is to incorporate a denaturant in the aerosol duster that can be detected in an abuse scenario, but undetectable when duster products are used as recommended. Denaturants considered included, for example, bitter almond oil, eucalyptol, menthol, thymol, vinegar, and denatonium benzoate.

Denatonium benzoate is an acutely bitter substance that can be detected by human taste at concentrations as low as 50 ppb. Thus denatonium benzoate can be used as a denaturant. For example, Davies et al. disclosed a liquefied petroleum gas composition containing denatonium benzoate in European Patent Number EP 0 884 377.

However, when the concentration of denatonium benzoate in the liquefied-gas aerosol dusting composition is too high, the denatonium benzoate can interfere with normal product use. When the concentration of denatonium benzoate in the liquefied-gas aerosol dusting composition is too low, it becomes ineffective as a deterrent to accidental or intentional misuses.

There is a need for a liquefied-gas aerosol dusting composition with a bittering additive agent that does not interfere with normal product use but is detectable in an inhalation abusive scenario so as to potentially discourage the practice.

SUMMARY OF THE INVENTION

A liquefied-gas aerosol dusting composition has been provided to discourage inhalation abuse incidents. The composition comprises at least one liquefied gas and denatonium benzoate, wherein the concentration of said denatonium benzoate in said aerosol dusting composition ranges from about 5 ppm to about 50 ppm.

The foregoing general description and the following detailed description are exemplary and explanatory only and are not restrictive of the invention as defined in the appended claims.

BRIEF DESCRIPTION OF THE DRAWING(S)

Embodiments are illustrated in the accompanying figures to improve understanding of concepts as presented herein.

Figure 1:
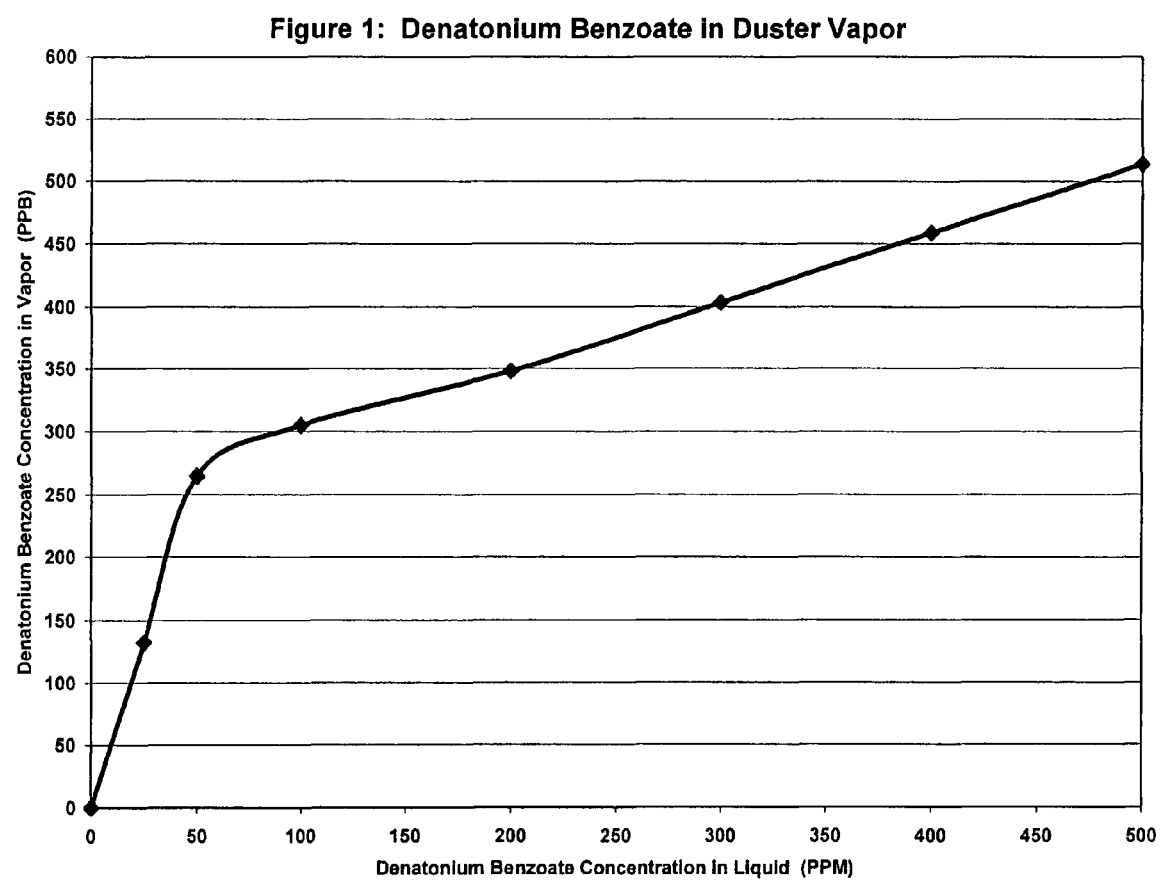

FIG. 1 shows the denatonium benzoate distribution between the liquid phase and vapor phase in a duster can. Denatonium benzoate dissolved in the liquefied gas will be dispensed in the vapor at a level lower than the addition level to the liquid when the solution volatilizes and vapor is dispensed from the duster can. The evaporating liquid carries only a portion of the added denatonium benzoate to the vapor, as shown in FIG. 1.

FIG. 2 shows the calculated concentrations of denatonium benzoate in the remaining liquid as the product is consumed.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION OF THE INVENTION

Before addressing details of embodiments described below, some terms are defined or clarified.

The term "a liquefied gas" is intended to mean a chemical compound or a mixture of chemical compounds that is in a liquid state under pressure. Such chemical compound or such mixture of chemical compounds is in a gaseous state at about 25° C. and atmospheric pressure.

A representative liquefied gas is selected from the group consisting of 1,1-difluoroethane (HFC-152a), 1,1,1,2-tetrafluoroethane (HFC-134a), dimethylether and hydrocarbons.

Representative hydrocarbons include propanes, butanes and pentanes, as well as all their isomers.

The term "denatonium benzoate" is intended to mean N-[2-[(2,6-Dimethylphenyl)amino]-2-oxoethyl]-N,N-diethylbenzenemethanaminium benzoate with CAS number of 3734-33-6. Denatonium benzoate is commercially available, e.g. from Sigma-Aldrich Corp. in Milwaukee, Wis.

Representative alcohols include ethanol, propanols and butanols, as well as all their isomers.

The term "ppm" is intended to mean parts per million by weight.

The term "ppb" is intended to mean parts per billion by weight.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

A liquefied-gas aerosol dusting composition has been provided to discourage inhalation abuse incidents. The composition comprises at least one liquefied gas and denatonium benzoate, wherein the concentration of said denatonium benzoate in said aerosol dusting composition ranges from about 5 ppm to about 50 ppm.

Many aspects and embodiments have been described above and are merely exemplary and not limiting. After reading this specification, skilled artisans appreciate that other aspects and embodiments are possible without departing from the scope of the invention.

Other features and benefits of any one or more of the embodiments will be apparent from the following detailed description, and from the claims.

The denatonium benzoate can be dissolved in the liquefied gas by suitable means such as mechanical mixing or by use of a co-solvent, like an alcohol or water.

In one embodiment of this invention, denatonium benzoate is first dissolved in a co-solvent, then the resulting solution is further mixed with the liquefied gas.

In another embodiment of this invention, a co-solvent is first mixed with the liquefied gas, and the denatonium benzoate is dissolved in such mixture.

In one embodiment of this invention, the liquefied-gas aerosol dusting composition is packaged in an aerosol container equipped with an aerosol valve that has no dip tube. When the valve is actuated for normal use, vapor is discharged and the liquefied gas evaporates to re-establish equilibrium pressure in the can.

When the liquefied-gas aerosol dusting composition forms a liquid-vapor phase equilibrium in a container (e.g. an aerosol container), the denatonium benzoate concentration in the vapor phase is lower than the denatonium benzoate concentration in the liquid phase, as shown in FIG. 1. Also, when the liquefied-gas aerosol dusting composition packaged in an aerosol container is consumed and discharged as a vapor, the denatonium benzoate concentration in the liquid phase of the remaining composition in the can will increase, as shown in FIG. 2, and consequently so will the denatonium benzoate in the vapor phase.

When the vapor discharged from the aerosol container contains about 50 to about 500 ppb of denatonium benzoate, denatonium benzoate does not interfere with normal product use but is detectable in an inhalation abusive scenario so as to potentially discourage the practice. The 50 ppb of denatonium benzoate in the vapor is high enough to be detected if the vapor contacts the mouth, and more than about 500 ppb of denatonium benzoate in the vapor begins to interfere with normal use.

To achieve about 50 ppb to about 500 ppb in the vapor phase, from FIG. 1, the denatonium benzoate concentration in the liquid phase should be kept between about 5 ppm and 500 ppm. Further recognizing that denatonium benzoate will concentrate in the remaining liquid as the liquefied-gas aerosol dusting composition is consumed, FIG. 2 shows that the initial denatonium benzoate addition to the liquefied gas at manufacture shall be about 5 ppm to about 50 ppm to keep the denatonium benzoate concentration in the liquid phase between about 5 ppm and 500 ppm through 90% use. Therefore, initial denatonium benzoate addition to the liquefied gas in the range of 5 ppm to 50 ppm will yield a vapor concentration of 50 ppb to 500 ppb denatonium benzoate through 90% consumption of the liquefied-gas aerosol dusting composition, making the denatonium benzoate essentially undetectable during normal use, but detectable in an abuse scenario.

EXAMPLES

The concepts described herein will be further described in the following examples, which do not limit the scope of the invention described in the claims.

Example 1

These experiments were conducted in glass aerosol bottles. HFC-152a was treated with denatonium benzoate in two ways
1. Simply adding denatonium benzoate as solid particles to the HFC-152a.
2. Dissolving benzoate in ethanol, and then adding a small amount of the denatonium benzoate/ethanol solution to the HFC152a.

Four samples were prepared

| Sample | Denatonium Benzoate Concentration |
|---|---|
| 0.12 g denatonium benzoate in 101.5 g HFC-152a | 1180 ppm |
| 0.0036 g denatonium benzoate in 100 g HFC-152a | 36 ppm |
| 5 g solution (0.1 g denatonium benzoate/10 g ethanol to 55 g HFC-152a | 909 ppm |
| 1.0 g solution (0.1 g denatonium benzoate/10 g ethanol) to 100 g HFC-152a | 100 ppm |

When the samples were used as dusters, that is, spraying vapors to remove dirt, the operator could detect a bitter taste from the vapors at denatonium benzoate concentrations of about 1000 ppm. The operator did not seem to detect a bitter taste from the vapors at 36 or 100 ppm denatoniam benzoate concentrations.

Example 1 demonstrates a composition comprising 1,1 difluoroethane (HFC-152a) and about 36-1180 ppm denatonium benzoate. Example 1 also demonstrates a method for making such composition. Example 1 also demonstrates that such liquefied-gas aerosol dusting composition with 36-100 ppm denatonium benzoate does not interfere with normal product use. Example 1 also demonstrates that a liquefied-gas aerosol dusting composition with 909-1180 ppm denatonium benzoate will interfere with normal product use.

Example 2

Example 2 further demonstrates that a liquefied-gas aerosol dusting composition with up to 50 ppm denatonium benzoate does not interfere with normal product use.

A single-blind, randomized, crossover evaluation of the presence of bitterant in an aerosol-spray dust remover under normal use conditions was conducted with volunteer users.

The objective of the study was to determine if potential users could detect the presence of bitterant in an aerosol-spray dust remover under normal use conditions. The products tested were a commercial unbittered HFC-152a duster; a Test HFC-152a duster with a 10 ppm denatonium benzoate and a Test HFC-152a duster with 50 ppm denatonium benzoate. One hundred subjects were enrolled for the tests.

To test each product, a technician sprayed the contents of an aerosol duster sample toward a 3×5 inch index card three times, for 5 seconds each time from a distance of approximately 6 inches. The subject was told to sniff the air over the index card and record if they detected any scent or sensation. The response was recorded. If the subject did detect a scent or sensation, they were asked to rate the intensity by marking a point on an line 10 cm in length, called a visual analog scale, for which the 0 and 10-cm endpoint intensities were described.

The same procedure was followed for each product sample, beginning with the unbittered sample and finishing with the two additional product samples in order of increasing denatonium benzoate concentration.

The data collected was reviewed to insure accuracy and analyzed as follows: A chi square analysis was performed comparing "yes/no" responses for the three (3) test products. In addition, visual analog scale data regarding intensity ratings were analyzed using the paired t-test, assigning a score of "0" for all participants responding "no". Lastly, a chi square analysis was performed on the distribution of visual analog scale scores divided into quintiles, assigning a score of "0" for all participants responding "no". This last analysis was conducted to account for those participants who might feel obliged to answer yes and score sensations very low. Comparative performance differences were considered significant at the $p<0.050$ level.

The analysis concluded that, under the conditions employed in this study, representing normal use conditions, consumers of the duster products with the test concentrations of denatonium benzoate are no more likely to detect a scent or taste than those of the control product without denatonium benzoate.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:

1. A liquefied-gas aerosol dusting composition consisting essentially of 1,1-difluoroethane, denatonium benzoate and alcohol, wherein the concentration of said denatonium benzoate in said aerosol dusting composition ranges from about 5 ppm to about 50 ppm.

2. The liquefied-gas aerosol dusting composition of claim 1 wherein said alcohol is ethanol.

3. A liquefied-gas aerosol dusting composition consisting essentially of 1,1-difluoroethane, hydrocarbon, denatonium benzoate and alcohol, wherein the concentration of said denatonium benzoate in said aerosol dusting composition ranges from about 5 ppm to about 50 ppm.

4. The liquefied-gas aerosol dusting composition of claim 3 wherein said alcohol is ethanol.

5. The liquefied-gas aerosol dusting composition of claim 3 wherein said hydrocarbon is selected from the group consisting of propanes, butanes, pentanes, and isomers thereof.

6. A liquefied-gas aerosol dusting composition consisting essentially of 1,1,1,2-tetrafluoroethane, denatonium benzoate and alcohol, wherein the concentration of said denatonium benzoate in said aerosol dusting composition ranges from about 5 ppm to about 50 ppm.

7. The liquefied-gas aerosol dusting composition of claim 6 wherein said alcohol is ethanol.

8. A liquefied-gas aerosol dusting composition consisting essentially of 1,1,1,2-tetrafluoroethane, hydrocarbon, denatonium benzoate and alcohol, wherein the concentration of said denatonium benzoate in said aerosol dusting composition ranges from about 5 ppm to about 50 ppm.

9. The liquefied-gas aerosol dusting composition of claim 8 wherein said alcohol is ethanol.

10. The liquefied-gas aerosol dusting composition of claim 8 wherein said hydrocarbon is selected from the group consisting of propanes, butanes, pentanes, and isomers thereof.

11. A liquefied-gas aerosol dusting composition consisting essentially of 1,1-difluoroethane, 1,1,1,2-tetrafluoroethane, denatonium benzoate and alcohol, wherein the concentration of said denatonium benzoate in said aerosol dusting composition ranges from about 5 ppm to about 50 ppm.

12. The liquefied-gas aerosol dusting composition of claim 11 wherein said alcohol is ethanol.

* * * * *